United States Patent
Heifets et al.

(10) Patent No.: US 7,752,212 B2
(45) Date of Patent: *Jul. 6, 2010

(54) ORTHOGONAL INTEGRATION OF DE-SERIALIZATION INTO AN INTERPRETIVE VALIDATING XML PARSER

(75) Inventors: Abraham Heifets, Cambridge, MA (US); Margaret G. Kostoulas, Veroia (GR); Moshe Morris Emanuel Matsa, Cambridge, MA (US); Eric Perkins, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 411 days.

This patent is subject to a terminal disclaimer.

(21) Appl. No.: 11/758,054

(22) Filed: Jun. 5, 2007

(65) Prior Publication Data

US 2008/0104095 A1 May 1, 2008

Related U.S. Application Data

(60) Provisional application No. 60/803,912, filed on Jun. 5, 2006.

(51) Int. Cl.
*G06F 17/30* (2006.01)
*G06F 7/00* (2006.01)

(52) U.S. Cl. .................. 707/755; 707/999.101; 717/104; 717/149

(58) Field of Classification Search .............. None
See application file for complete search history.

(56) References Cited

U.S. PATENT DOCUMENTS

| 6,789,252 | B1* | 9/2004 | Burke et al. ............... 717/100 |
| 2001/0047385 | A1* | 11/2001 | Tuatini ..................... 709/203 |
| 2006/0259898 | A1* | 11/2006 | Reinhardt ................. 717/124 |

* cited by examiner

*Primary Examiner*—Sathyanarayan Pannala
(74) *Attorney, Agent, or Firm*—Cuenot, Forsythe & Kim, LLC

(57) ABSTRACT

A computer-implemented method of creating a schema specific parser for processing Extensible Markup Language (XML) documents can include receiving an XML schema comprising a plurality of components, determining a hierarchy of the plurality of components of the XML schema, and creating an execution plan specifying a hierarchy of XML processing instructions. Each XML processing instruction can be associated with an XML processing function of a virtual machine that performs an XML document processing task. The hierarchy of XML processing instructions can be determined according to the hierarchy of components of the XML schema. An instruction causing the virtual machine to invoke a de-serialization module that extracts at least one item of information from the XML document can be inserted into the execution plan. The execution plan can be compiled into a bytecode version of the execution plan that is interpretable by the virtual machine. The bytecode version of the execution plan can be output.

20 Claims, 9 Drawing Sheets

400

| Instruction / Function Name | Functionality |
|---|---|
| READ_TAG *ISMIXED* | Read forward to the end of the next tag in either mixed mode (allowing both text characters and elements) or element-only mode. The tag to be consumed may be any start or end tag. End tags are checked for well-formedness against matching or corresponding start tags. |
| READ_TAG_WITH_QNAME *ISMIXED QNAME* | Read forward to the end of the next tag in either mixed mode or element-only mode. While scanning, validate that the name of the tag matches the given QName. The input stream can be directly compared against a fixed tag name. Symbol table lookup is avoided since the identifier is already known. |
| READ_END_TAG *ISMIXED* | Read forward to the end of the next tag in either mixed mode or element-only mode. While scanning, verify that the tag is an end tag, and match the end tag lexically against the balancing start tag. Compares the input buffer against a known string, in this case the balancing start tag. |
| READ_EMPTY | Read the next tag, which must be an end tag, and must match the corresponding and balancing start tag. Validate that there is no intervening character content. This instruction functions similar to READ END TAG, except that it also validates that no character content was read. |
| READ_SIMPLE_CONTENT *TYPEID* | Read character data forward to the end of the next tag, which must be an end tag, and must match its balancing start tag. Validate the intervening content using the built-in simple type handler given by the type ID. Content is handled by a type-specific scanner that can validate the content as scanned. The end tag can be handled as in READ END TAG. |
| READ_EOF | Read forward to the end of the file, matching the XML production for TrailingMisc, e.g., checking well-formedness of comments, processing-instructions, white-space, etc. |

| Instruction / Function Name | Functionality |
|---|---|
| ASSERT_TAG_QNAME *ALLOWEDQNAMES={QNAMEID ...}* | Assert that the current tag matches one of the members of the set of allowed QNames. |
| ASSERT_ATTRS *ALLOWEDATTRIBUTESET REQUIREDATTRIBUTESET* | Assert that the attributes of the current tag obey the collective attribute occurrence constraint as represented with two sets, one for excluded attributes and one for required attributes. |
| ASSERT_ATTR_CONTENT *QNAMEID TYPEID* | Check the attributes of the current tag for the given attribute QName, and if present, validate content using the built-in simple type handler given by the type ID. |
| FAIL | Unconditional assertion failure. |

| Instruction / Function Name | Functionality |
|---|---|
| PUSH_NEW_ALL_OCCURRENCE_SET | Push a new, empty set onto the all occurrence set stack. |
| TEST_AND_SET_ENTRY *ID* | Add the given ID to the current set, asserting that the given ID was not already present. |
| POP_ASSERT_SET *REQD SET* | Pop the current set off of the set stack and assert that the current set is a superset of the given required IDs to check "all group" occurrence constraints of XML schema. |
| PUSH_COUNTER | Push a new counter onto the stack and initialize to zero. |
| INCREMENT_COUNTER | Increment the top counter on the stack. |
| POP_COUNTER | Discard the top counter on the stack. |
| JUMP_COUNTER_LESS *VALUE LABEL* | Branch to the given label if the top counter is less than the given value. |
| ASSERT_COUNTER_GREATER_OR_EQUAL *VALUE* | Assert that the top counter is greater or equal to the given minimum value. Otherwise, fail. |

| Instruction / Function Name | Functionality |
|---|---|
| JUMP_TAG_NOT_EQUAL *QNAMEID OFFSET* | Branch to the instruction at the given offset if the tag does not match the given QName. |
| JUMP_UNCONDITIONAL *OFFSET* | Branch unconditionally to the given offset. |
| CALL_TYPE *NIL DEFAULTTYPE EXCLUDEDTYPESET* | Dispatch to the content model for the current start tag. The content model is determined either by the instance value of xsi:type or by the supplied default type ID. The actual type ID is checked against the type exclusions set (EXCLUDEDTYPESET). The excluded types aggregate the various constraints on the runtime type of the elements as specified by the element declaration and the type definition for the default type. If the resolved type is complex, the parser dispatches to the handler for that complex type, and resumes processing. If the resolved type is simple, the corresponding built-in simple type handler is used. The NIL argument tells the complex type which processing is allowed for xsi:nil in this context. |
| RETURN | Return control from the current complex type handler to its caller. |
| RETURN_IF_NIL | Check the attributes of the current tag for the xsi:nil attribute. If present and bearing the value true, read the next tag as in READ_EMPTY, and return control from the current complex type handler to its caller. In all other cases, continue execution. |

```
<xsd:complexType name="ExampleType">
    <xsd:sequence>
        <xsd:choice>
            <xsd:element name="Name1" type="Type1"/>
            <xsd:element name="Name2" type="Type2"/>
        </xsd:choice>
        <xsd:element name="Name3" type="Type3"/>
    </xsd:sequence>
    <xsd:attribute name="attr1" type="xsd:string" use="required"/>
    <xsd:attribute name="attr2" type="xsd:string"/>
    <xsd:attribute name="attr3" type="xsd:string"/>
</xsd:complexType>
```

```
<exampleType attr1="foo" attr2="bar" attr3="baz">
    <Name2> .... </Name2>
    <Name3> .... </Name3>
</exampleType>
```

DESERIALIZATION: type="JAXRPC" action=push-bean stub=ExampleTypeBeanStub
ASSERT_ATTRS AllowedAttributeSets={'attr1','attr2','attr3'} RequiredAttributeSet={'attr1'}
ASSERT_ATTR_CONTENT 'attr1' xsd:string
DESERIALIZATION: type="JAXRPC" action=set-simple-field stub=ExampleTypeBeanStub
    fieldname="attr1-name"
ASSERT_ATTR_CONTENT 'attr2' xsd:string
DESERIALIZATION: type="JAXRPC" action=set-simple-field stub=ExampleTypeBeanStub
    fieldname="attr2-name"
ASSERT_ATTR_CONTENT 'attr3' xsd:string
DESERIALIZATION: type="JAXRPC" action=set-simple-field stub=ExampleTypeBeanStub
    fieldname="attr3-name"
READ_TAG QNAMES element-onlyAllowedNames={'Name1', 'Name2'}
JUMP_TAG_NOT_EQUAL 'Name1' 4
CALL_TYPE non-nillable defaultType=Type1 AllowedTypes={Type1}
DESERIALIZATION: type="JAXRPC" action=pop-bean-and-set-field stub=ExampleTypeBeanStub
    fieldname="Name1-name"
JUMP_UNCONDITIONAL 3
CALL_TYPE non-nillable defaultType=Type2 AllowedTypes={Type2}
DESERIALIZATION: type="JAXRPC" action=pop-bean-and-set-field stub=ExampleTypeBeanStub
    fieldname="Name2-name"
READ_TAG_WITH_QNAME element-only 'Name3'
CALL_TYPE non-nillable defaultType=Type3 AllowedTypes={Type3}
DESERIALIZATION: type="JAXRPC" action=pop-bean-and-set-field stub=ExampleTypeBeanStub
    fieldname="Name3-name"
READ_END_TAG
RETURN

FIG. 11

ORTHOGONAL INTEGRATION OF DE-SERIALIZATION INTO AN INTERPRETIVE VALIDATING XML PARSER

CROSS-REFERENCE TO RELATED APPLICATIONS

This application claims the benefit of Provisional Patent Application No. 60/803,912, filed in the United States Patent and Trademark Office on Jun. 5, 2006, the entirety of which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Extensible Markup Language (XML) refers to a flexible type of data encoding. XML coded messages can be exchanged between computer programs of a system without concern over aspects of the system such as the type of programming language in which each respective computer program is implemented, the type of information processing systems involved, or the manner of message transmission. XML allows virtually any component of a system, e.g., a UNIX program, to communicate with any other component of the system, e.g., a program written in the C programming language for execution within a Windows-type of computing environment.

XML schemas specify classes of allowable XML documents, or XML messages, that a system will accept. In general, an "XML schema" refers to a type of XML document that expresses constraints on the structure and content of XML documents that can be accepted by a given system. Publishing an XML schema allows a system to define the type of messages that the system is willing to accept. A validating parser can analyze received XML documents with respect to an XML schema and discard non-conforming or invalid XML documents.

BRIEF SUMMARY OF THE INVENTION

The present invention relates to parsing, validating, and de-serializing Extensible Markup Language (XML) documents. One embodiment of the present invention can include a computer-implemented method of creating a schema specific parser for processing XML documents. The method can include receiving an XML schema comprising a plurality of components, determining a hierarchy of the plurality of components of the XML schema, and creating an execution plan specifying a hierarchy of XML processing instructions. Each of the XML processing instructions can be associated with an XML processing function of a virtual machine that performs a task of processing an XML document. The hierarchy of XML processing instructions can be determined according to the hierarchy of components of the XML schema. An instruction that causes the virtual machine to invoke a de-serialization module that extracts at least one item of information from the XML document can be inserted into the execution plan.

The execution plan can be compiled into a bytecode version of the execution plan that is interpretable by the virtual machine. The bytecode version of the execution plan can be output.

Another embodiment of the present invention can include a computer-implemented method of processing an XML document. The method can include loading an execution plan into a virtual machine, wherein the virtual machine consists of XML processing functions and the execution plan represents an XML schema, and selectively invoking XML processing functions available within the virtual machine according to the execution plan, wherein the XML processing functions operate upon the XML document conforming to the XML schema represented by the execution plan. A de-serialization module can be selectively invoked according to the execution plan, wherein the de-serialization module is configured as a plug-in of the virtual machine and de-serializes at least one item of information from the XML document. The de-serialized item of information can be output.

Yet another embodiment of the present invention can include a computer program product including a computer-usable medium having computer-usable code that, when executed, causes a machine to perform the various steps and/or functions described herein.

BRIEF DESCRIPTION OF THE SEVERAL VIEWS OF THE DRAWINGS

FIG. 4 is a table illustrating XML processing instructions and associated functions of a virtual machine in accordance with another embodiment of the present invention.

FIG. 5 is a table illustrating XML processing instructions and associated functions of a virtual machine in accordance with another embodiment of the present invention.

FIG. 6 is a table illustrating XML processing instructions and associated functions of a virtual machine in accordance with another embodiment of the present invention.

FIG. 7 is a table illustrating XML processing instructions and associated functions of a virtual machine in accordance with another embodiment of the present invention.

FIG. 9 is an example of an XML schema fragment which is useful for understanding embodiments of the present invention.

FIG. 10 is an example of an XML document that is to be processed according to the XML schema fragment of FIG. 9.

FIG. 11 is an example of a fragment of an execution plan that can be automatically generated by the system of FIG. 1 in accordance with another embodiment of the present invention.

DETAILED DESCRIPTION OF THE INVENTION

Figure 1:
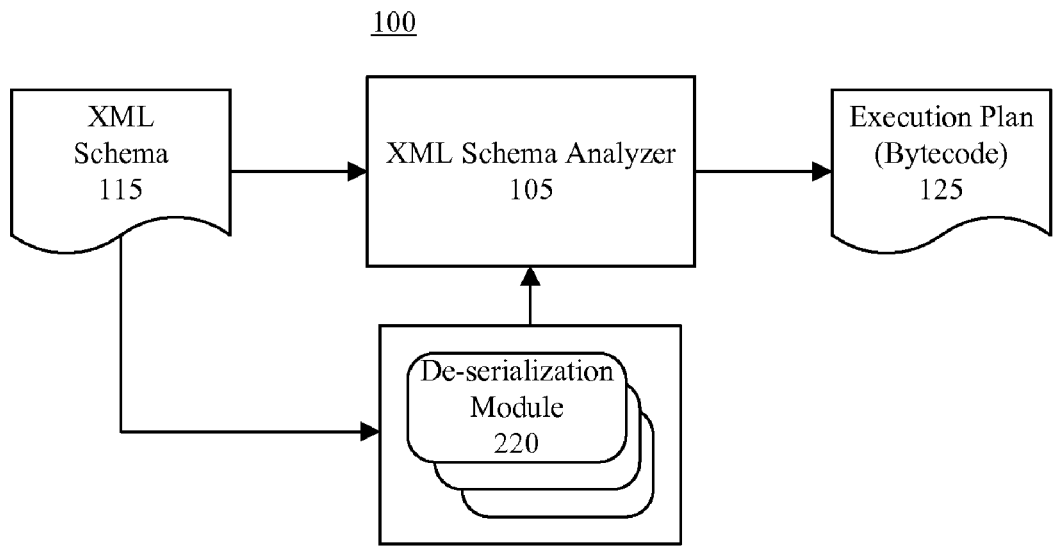
FIG. 1 is a block diagram illustrating a system that automatically generates an execution plan for processing an Extensible Markup Language (XML) document in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain or store the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or other similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to processing Extensible Markup Language (XML) documents. A virtual machine for use in parsing, validating, and de-serializing XML documents can be provided. The virtual machine can be configured solely for the purpose and use of processing XML documents. The virtual machine can be configured to utilize one or more de-serialization modules to de-serialize or extract selected items of information from received XML documents. The virtual machine can be configured such that de-serialization operations are orthogonal to the parsing and/or validation tasks. Accordingly, the de-serialization modules can be "pluggable" components of the virtual machine that are independent of XML document processing functions. This permits users to create and provide de-serialization modules as needed without having to alter the underlying functionality of the virtual machine or associated parts of the execution plan executed or interpreted by the virtual machine.

FIG. 1 is a block diagram illustrating a system 100 that can automatically generate an execution plan 125 in accordance with one embodiment of the present invention. The execution plan 125, when executed by an appropriate virtual machine (not shown), can implement a schema specific parser that can process XML documents and ensure that such documents conform to a given XML schema. As shown, the system 100 can include an XML schema analyzer 105. In general, the XML schema analyzer 105, given an XML schema, such as XML schema 115, as input, can generate and output an execution plan 125.

In one embodiment, the execution plan 125 can be a hierarchically ordered listing of XML processing instructions that correspond to XML processing functions that are available within a virtual machine. The execution plan 125 can be compiled into bytecode that is interpretable by the virtual machine. In this sense, the execution plan 125 can be considered to be a bytecode program that is executed by the virtual machine.

As used herein, the term "bytecode" can refer to machine-independent code, which may be binary code, that can be interpreted or executed by a virtual machine. Typically, a program written in a particular programming language is compiled into a bytecode program. The phrase "virtual machine," as used herein, can refer to a self-contained operating environment that behaves like an independent computer system. Virtual machines also are referred to as "interpreters" or "runtime environments." Typically a virtual machine operates in conjunction with, yet independently of, a host operating system. Virtual machines are configured to execute bytecode programs. Each instruction in a bytecode program can reference a particular function embedded or otherwise included within the virtual machine. As each bytecode instruction is executed, the functionality within the virtual machine that maps to, or is associated with, the executed bytecode instruction can be invoked or executed.

In one embodiment of the present invention, a virtual machine can be configured to include a plurality of functions for XML document processing called XML processing functions (functions). Each function can be written at a high level of granularity to perform a particular function that is needed or related to processing an XML document with respect to a given XML schema, XML schema component and/or element. For example, a single function can perform an XML processing function that, if written in a conventional high level programming language such as C or Java, would require possibly hundreds of lines of code. In this regard, the XML processing functions are "chunky" as each replaces a large number of instructions in a conventional high level programming language. The bytecode instructions of the execution plan 125 can map or indicate particular ones of the functions of the virtual machine to invoke. In one embodiment, the virtual machine can be limited to only offer or include such XML processing functions and no other functionality.

The XML schema analyzer 105 can receive the XML schema 115 as input. In general, the XML schema analyzer 105 can analyze the XML schema 115 on a component-by-component basis and determine the hierarchy of the XML schema 115. For example, the XML schema analyzer 105 can determine the arrangement of components of the XML schema 115 as well as the structure of such components. In one embodiment, the XML schema analyzer 105 can perform a mapping of components of the XML schema 115 to available functions of the virtual machine. Through this mapping process, an execution plan specifying a hierarchy of XML processing instructions referencing the functions can be generated. The hierarchy of XML processing instructions, and therefore functions, can mirror the hierarchy of the XML schema 115, thereby specifying the allowable structure and form of XML documents.

Conventional XML parser generators typically translate an XML schema into an abstract form called "Deterministic Finite Automata" (DFA) or other grammars. Such grammars are a collection of states, with transitions between each state specified on different possible inputs. Such grammars are a representation of the XML schema that does not explicitly encode any portion of the XML schema semantics.

In accordance with the embodiments disclosed herein, a substantial portion, if not all, of the execution plan 125 can be mapped directly to the XML schema components. That is, the execution plan 125 can explicitly encode one or more portions or all of the XML schema 115 in the form of XML processing instructions that, when converted to bytecode instructions, invoke the functions of the virtual machine. The XML schema analyzer 105 can compile the execution plan to produce a bytecode implementation of the execution plan 125.

The system 100 further can include one or more de-serialization modules 220. In one embodiment, the de-serialization modules 220 can analyze the XML schema 115 either prior to the XML schema analyzer 105 or as requested by the XML schema analyzer 105. The de-serialization module 220 can insert de-serialization instructions into the execution plan that is being generated or instruct the XML schema analyzer 105 how to insert such instructions. Each de-serialization module 220 can include this "compile" time functionality as well as functionality to be described herein in greater detail with respect to runtime.

The compile time functionality of the de-serialization modules 220 can write new instructions, e.g., de-serialization instructions, into the execution plan in an automated manner. In one embodiment, the behavior of the de-serialization module 220 can be configured through an interface by a user. Once specified, the behavior of the de-serialization modules 220 can be persisted.

In one embodiment, the de-serialization modules 220 can process and annotate the XML schema 115. The annotated XML schema 115 can be provided to the XML schema analyzer 105. The annotations can indicate how de-serialization instructions are to be inserted into the execution plan 125 being generated for each respective de-serialization module 220. In another embodiment, the XML schema analyzer 105 can query the de-serialization modules 220 regarding different portions of the XML schema 115 being analyzed.

Whether through querying or annotations, the de-serialization modules 220 can specify, for example, for "Name1" element start tags call the DESERIALIZATION_X_NAME1_BEGIN" de-serialization function of de-serialization module X. For "Name2" element start tags call the "DESERIALIZATION_X_NAME2_BEGIN" de-serialization function of de-serialization module X. For "Name3" element start tags, no de-serialization function is available. Accordingly, in the case of Name3, no de-serialization instructions would be added to the execution plan 125 and no processing beyond parsing and/or validation would occur.

Consider the case where a de-serialization module 220 is a JAX-RPC de-serialization module. The JAX-RPC de-serialization module can process the XML schema 115 and provide information to the XML schema analyzer 105 specifying how to handle de-serialization with respect to the JAX-RPC de-serialization module, e.g., at runtime. The de-serialization module 220 need only be designed one time per de-serialization scheme, but still can function across all XML schemas.

In another embodiment, each de-serialization module 220 can be implemented as two individual modules where one module embodies the compile time functionality and the other module embodies the runtime functionality. The runtime functionality effectively understands de-serialization instructions inserted into the execution plan 125. In such an embodiment, the runtime module need only be distributed or deployed to runtime locations.

In another embodiment, the XML schema analyzer 105 can include a user interface (not shown). The user interface can be any of a variety of user interfaces, including graphical or programmatic, through which a user or developer can provide user input indicating the particular data to be extracted from a received XML document. For example, the user can select and/or annotate the XML schema 115 to specify one or more items of information to be extracted from XML documents. In one embodiment, having loaded and analyzed the XML schema 115, a user can specify portions or sections of the XML schema 115 that corresponds to the items of information that the user would like extracted from a received XML document.

The XML schema analyzer 105, responsive to receiving the user-specified items of information to be extracted, can insert an instruction within the execution plan 125 being generated. The instruction can be a de-serialization instruction that causes the virtual machine to invoke a de-serialization module. As used herein, "serialization" can refer to the process of converting the state of an object into a form that can be persisted or transported. The complement of serialization is "de-serialization," which can refer to converting a stream into an object.

Figure 2:
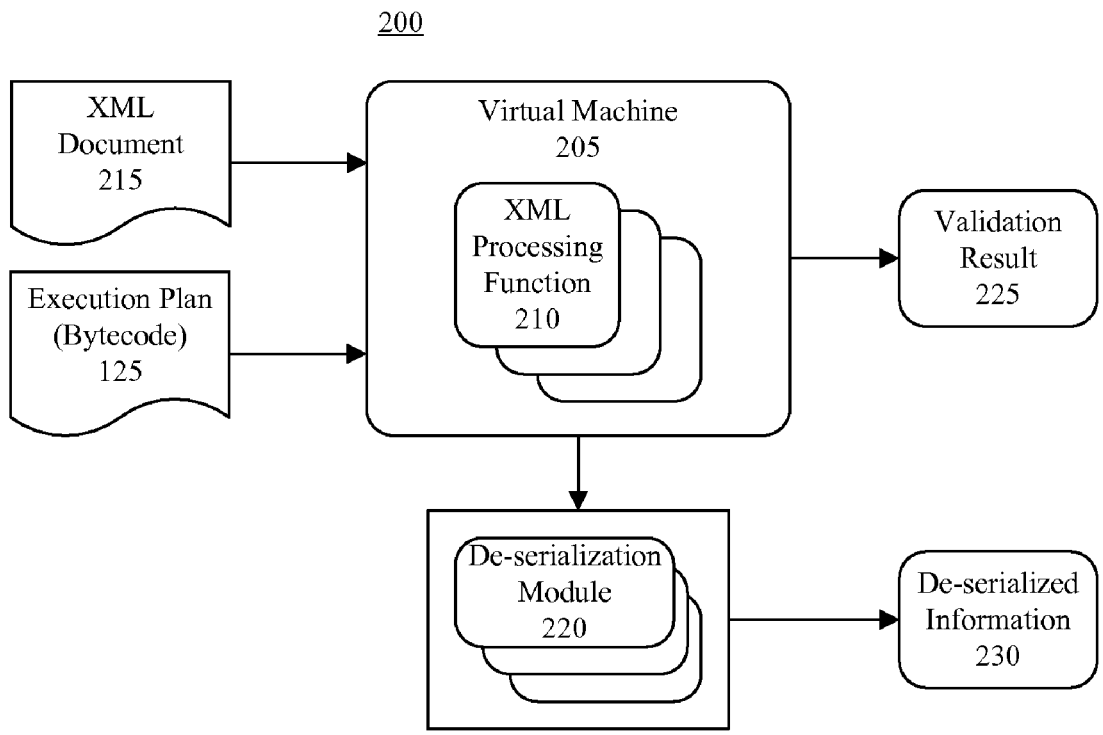
FIG. 2 is a block diagram illustrating a system for processing an XML document in accordance with another embodiment of the present invention.

FIG. 2 is a block diagram illustrating a system 200 for validating an XML document in accordance with another embodiment of the present invention. The system 200 can include a virtual machine 205. The virtual machine 205 can include one or more functions 210. Each of the functions 210 can be associated with a given source code instruction, e.g., an XML processing instruction, or bytecode instruction. In one embodiment, the virtual machine 205 can be configured to only include functionality relating to XML document processing, e.g., parsing, validation, and/or de-serialization. Accordingly, each of the functions 210 can relate solely to XML document processing and perform such a function. A virtual machine configured in this manner has limited functionality, but increased performance in terms of XML document processing. In another embodiment, each of the functions 210 included in the virtual machine 205 can be native code implementations. That is, each of the functions 210 included as part of the virtual machine 205 can be available for execution by the virtual machine 205 in the form of compiled machine code.

In illustration of the XML processing functionality of the virtual machine 205, one function 210 can read a section of the XML document being processed. Another function 210 can check attributes allowed for that section. A "component," as used herein, can refer to a component as defined in section 3 of "XML Schema Part 1: Structures Second Edition, W3C," and "XML Schema Part 2: Datatypes Second Edition," which are incorporated herein by reference.

In one embodiment, the functions 210 of the virtual machine 205 can be organized or combined to form handlers. As such, each handler can include one or more functions. For example, a handler that will be tasked with, among other things, validating a date can include a function for validating dates. The function may or may not be passed one or more parameters that can be extracted from the XML schema. Other functions can be included within different handlers as may be required. In another embodiment, a handler can refer to a collection of one or more functions that collectively process a component. Without such "coarse-grained" procedures and/or handlers, in reference to both handlers and functions, processing an XML document would be implemented using much lower level primitives, e.g., on the order of using many individual programming statements rather than functions 210 directed to the component and/or element level of an XML document.

As shown, the virtual machine 205 also can include one or more de-serialization modules 220. If the de-serialization modules 220 are implemented as separate compile time and runtime modules, then the de-serialization modules 220 depicted in FIG. 2 can be runtime versions of the de-serialization modules, e.g., de-serialization modules that understand de-serialization bytecode instructions. The de-serialization modules 220 can be incorporated into the virtual machine 205 as plug-in type functions. In one embodiment, the de-serialization modules 220 can be machine code functions. By incorporating the de-serialization modules 220 into the virtual machine 205 through a plug-in architecture, the de-serialization modules 220 can be provided by third-parties, e.g., users or other vendors for use with the virtual machine 205. In this manner, de-serialization modules 220 can be independent of the virtual machine 205 thereby allowing the addition or removal of de-serialization modules to or from the collection of de-serialization modules 220 that are accessible by the virtual machine 205. Each de-serialization module 220 can be registered with the virtual machine 205.

In one embodiment, the de-serialization modules 220 can be implemented as a generic extension framework. In this regard, the de-serialization modules 220 can be configured to perform further processing beyond parsing, validation, and/or de-serialization that may be related to the XML schema.

In any case, this independence from the virtual machine 205 allows further de-serialization modules 220 to be added that are suited for de-serializing or extracting a particular type or item of information from an XML document. One de-serialization module 220, for example, can be configured to de-serialize shipping information. Another de-serialization module 220 can be configured to de-serialize payment information. Further, each de-serialization module 220 can be configured to output the de-serialized information 230 in any suitable format.

For example, one de-serialization module 220 can output de-serialized information 230 in the form of Java beans, while another outputs de-serialized information 230 as a Document Object Model (DOM) tree, as Simple Application Programming Interface (API) for XML (SAX) events, characters including an XPath selection, or according to a custom datatype definition. The particular functionality of each de-serialization module 220 in terms of the data that is extracted from the XML document and the format of the de-serialized data that is output by the de-serialization module 220 can be driven by the particular system(s) to which each de-serialization module 220 is providing data.

It should be appreciated that while the de-serialization modules 220 have been depicted as being external to the virtual machine 205, the de-serialization modules 220 may be viewed as being part of the virtual machine 205. The de-serialization modules 220 largely are depicted external to the virtual machine 205 as each can function as a plug-in that is independent of the virtual machine 205 and functionality provided to the virtual machine 205.

The virtual machine 205 can load an XML document 215 as well as the execution plan 125. Loading the execution plan 125 into the virtual machine 205, effectively, results in a schema specific parser that can process the XML document 215 in accordance with a particular XML schema, e.g., the XML schema 115 of FIG. 1 from which the execution plan 125 was generated. It further should be appreciated that the virtual machine 205 effectively can be re-configured to implement a different schema specific parser simply by loading an execution plan derived from a different XML schema.

Upon loading and executing the execution plan 125, the virtual machine 205 effectively is configured as a schema specific parser. This configuration can include a scanning, e.g., parsing, layer that can read XML document 215 byte-by-byte as well as a validation layer. A third layer, e.g., a de-serialization layer, also can be included. The functions 210 can implement the layers such that when executed, the layers can be intermingled. In illustration, the parsing functionality can be mixed with the validation functionality such that when a component or other section of an XML document is parsed, as soon as enough information is scanned to determine whether the component or section is valid or invalid, as the case may be, the virtual machine 205 can make a determination at that moment and output a validation result 225. Further, portions of the XML document can be de-serialized during the parsing and/or validation process or at the conclusion of a parsing or validation operation for a given section of the XML document 215. The validation result 225 can indicate whether the XML document 215 is valid or invalid.

For example, a simple content component can be read such as a date. The validation layer can determine whether the data is of the correct type prior to proceeding, or scanning, a next component. If not a date, for example, the virtual machine 205, in executing the execution plan 125, can indicate that the XML document 215 is invalid immediately upon determining the nonconforming component or element rather than continue validation processing until an end tag is encountered.

As noted, the functions 210 of the virtual machine 205 can be configured so that each function, or selected functions, implement both the scanning and validation layers. This allows data items such as dates or integers to be scanned and validated. In other words, after reading each character and checking that the characters that were read are legal XML data characters, the functions further can be configured to verify that the data item is legal, e.g., a legal date or integer character, in the read location. The data can be stored for validation. A de-serialization function further can be applied to the characters prior to moving to a next portion of data for processing.

For example, consider a decimal that the XML schema restricts to be less than 100. A decimal starting with "2" can continue only with 0-9, dot ("."), or finish. Accordingly, the function 210 need not determine that the next character is any valid character, but one of the enumerated choices noted above. If, for example, the next character is "6" the function 210 can determine that the decimal is now "26." When the end of the decimal is identified, a check can be performed to determine whether the decimal is less than 100. As such, the data does not have to be revisited after parsing for validation to be performed. A separate pass of the data need not be performed solely for validation. The same sort of processing can be performed for dates. With respect to tag-reading, functions can perform similar functionality when tag names are not only valid XML name characters, but also are valid for exactly that tag name.

As bytecode instructions of the execution plan 125 are executed or interpreted by the virtual machine 205, functions 210 of the virtual machine 205 associated with the bytecode instructions can be executed or invoked. Similarly, as a particular de-serialization instruction is executed, the virtual machine 205 can select the de-serialization module 220 that offers the functionality needed to de-serialize the information indicated by the de-serialization instruction.

In one embodiment, as a de-serialization instruction is read, the virtual machine 205 can identify the particular type of information to be extracted from the XML document, e.g., identify attributes relating to the de-serialization function to be performed. The virtual machine can begin querying each de-serialization module 220 on a list of de-serialization modules 220 available to the virtual machine 205, e.g., each registered de-serialization module 220, to determine whether one of the de-serialization modules 220 does perform the needed de-serialization operation. When the virtual machine 205 determines that one of the de-serialization modules 220 does perform the needed de-serialization operation, the virtual machine 205 can invoke that de-serialization module 220. In another embodiment, one or more de-serialization schemes can be built into the virtual machine 205 such as SAX or another known de-serialization scheme.

In illustration, when the virtual machine 205 interprets the execution plan 125 and encounters a de-serialization bytecode instruction, the virtual machine 205 may not know how to interpret such an instruction. Accordingly, the virtual machine 205 can query the de-serialization modules 220, effectively asking the de-serialization modules 220 to execute the de-serialization bytecode instruction. Any needed information needed by the de-serialization module 220 can be obtained from the bytecode de-serialization instruction and passed from the virtual machine 205 to the de-serialization module 220.

As noted, the plug-in architecture which incorporates the de-serialization modules 220 into the virtual machine 205 allows any de-serialization module to be added or removed at runtime of the virtual machine 205 without changing the execution plan 125 other than by adding and/or removing de-serialization instructions or bytecodes. In one embodiment, because de-serialization modules 220 can be queried for data extraction capabilities, rather than according to a reference to a particular de-serialization module 220, one de-serialization module 220 can be replaced with another without modification of the execution plan 125. In the event that no de-serialization module 220 in the list handles the de-serialization operation needed, the virtual machine 205 can ignore the de-serialization instruction and proceed to the next bytecode instruction of the execution plan 125 for interpretation.

In one embodiment, each de-serialization bytecode instruction can operate on the current piece of data. In illustration, if a begin-element tag has just been validated, de-serialization bytecode instructions that throw SAX or SAX-like events can be inserted immediately after the bytecode instruction that validates the piece of data. The events can pass through the name of the element and attribute-name/value pairs. In another embodiment, the de-serialization bytecode instructions inserted can cause a new Java object to be constructed to represent the element corresponding to the begin tag.

It should be appreciated that one de-serialization instruction can be inserted immediately following a given XML processing instruction or multiple de-serialization instructions can be inserted immediately following a given XML processing instruction. When more than one de-serialization instruction immediately follows a given XML processing instruction, each such de-serialization instruction can invoke a different de-serialization operation and/or module. The de-serialization modules and operations invoked by each respective de-serialization instruction, when both immediately following the same XML processing instruction of the execution plan, can operate upon the same input data, and produce different results, whether extracting different types of information from the input data, producing a different type of output formatting, or the like.

Figure 3:
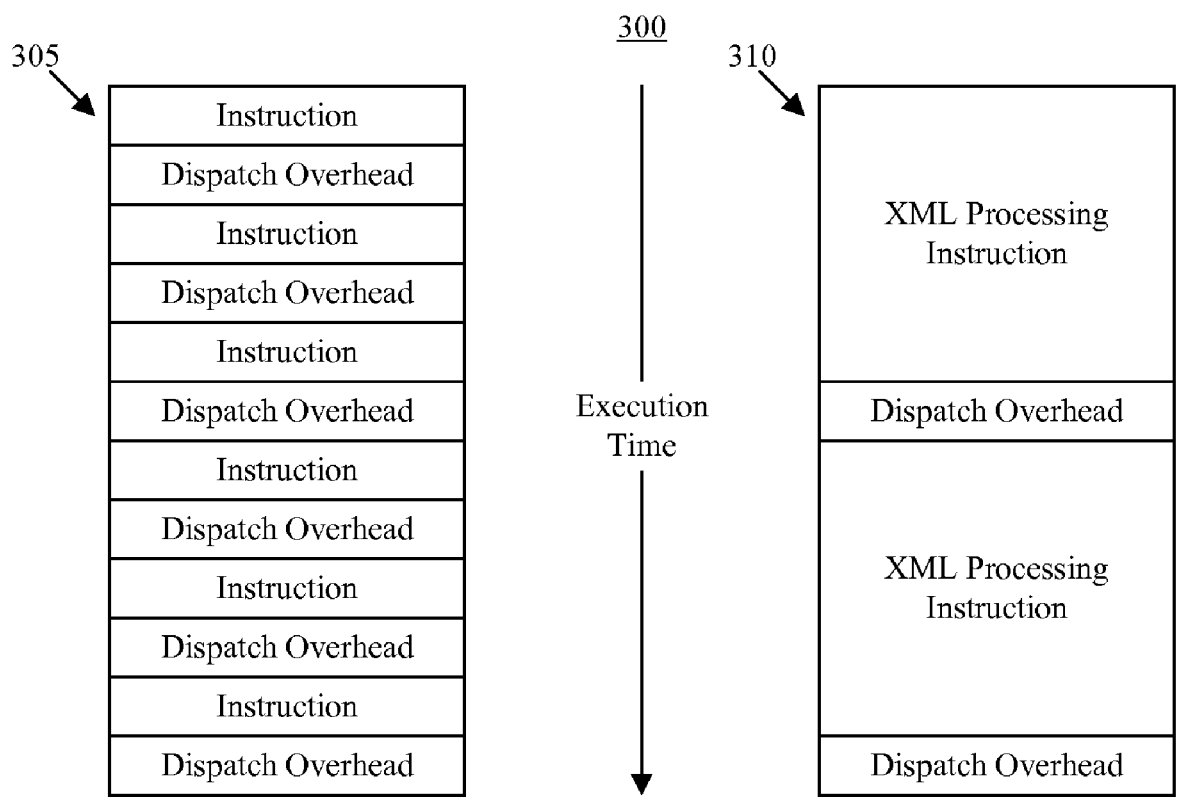
FIG. 3 is a block diagram illustrating functionality of a virtual machine in accordance with another embodiment of the present invention.

FIG. 3 is a block diagram 300 illustrating the functionality of a virtual machine in accordance with another embodiment of the present invention. Block 305 illustrates virtual machine execution of a conventional bytecode program with low level primitives as instructions. Between each instruction, dispatch overhead is incurred which represents the time needed for the virtual machine to determine the appropriate virtual machine function for a given bytecode instruction.

Block 310 illustrates virtual machine execution of an execution plan in accordance with the embodiments disclosed herein. While dispatch overhead still occurs between each XML processing instruction (or resulting bytecode instruction after compilation), the course-grained nature of the functions executed for each respective bytecode instruction serves to reduce the dispatch overhead relative to the amount of work performed. Block 310 illustrates that when fewer instructions, e.g., course-grained instructions, are used to accomplish an amount of work that otherwise would require many more bytecode instructions, dispatch overhead decreases and operational efficiency increases. More work is performed per unit of dispatch overhead. Moreover, as the range of operations supported by the virtual machine is limited to XML document processing, the virtual machine implementation can be smaller and more efficient. In other words, if a given amount of work performed by two simple instructions can be performed by a single, more complex instruction, the dispatch overhead is reduced, resulting in a more efficient system.

FIGS. 4-7, taken collectively, illustrate a variety of instructions that can be included within execution plans and corresponding functions, referenced by the XML processing instructions, that can be included within the virtual machine. The functions of FIGS. 4-7 represent basic primitives of XML scanning and validation and, as such, are designed to be coarse-gained. The XML processing instructions are shown in capital letters while parameters of the XML processing instructions are indicated in italics.

It should be appreciated that qualified names can be represented in a number of ways such as character strings or symbol table ID numbers. Sets can be represented as bit-vectors, linked lists, arrays, hash-maps, or the like. Control flow may be represented with any of a variety of common techniques such as jumps to offsets, "gotos" to labels, or branching constructs such as if/then/else, switch, choose/when/otherwise, or while/do/end. Allowed and forbidden may be interchangeable representations, e.g., through set negation. The functions illustrated herein are intended to demonstrate the high level of granularity used, e.g., "chunky" functions, as compared to conventional techniques that utilize low level code. Other alternative logic types or constructs similar to those noted above can be used in place of those illustrated in the tables.

FIG. 4 is a table 400 illustrating XML processing instructions and associated functions of a virtual machine configured in accordance with another embodiment of the present invention. As noted, the XML schema analyzer of FIG. 1 can create an execution plan including XML processing instructions that reference the functions of the virtual machine. The order and hierarchy in which the functions are referenced can be determined according to the hierarchy and/or structure of the XML schema being analyzed.

Table 400 illustrates various functions that read components and/or sections of an XML document into the virtual machine. Portions of the XML document being validated can be read into the virtual machine on a byte-by-byte level. Decisions affecting execution of the scanning, validation, and/or de-serialization can occur on a component-by-component level. In this regard, one or more of the functions can be combined, or called, to parse and/or validate a particular type of component of the XML schema, e.g., simple, complex, mixed, etc. It should be appreciated that, with respect to the descriptions of the various functions, the term "tag" can refer to any start or end tag, including all of the attributes of a tag. Empty element tags can be treated as if the empty element tags have been expressed in an equivalent syntax using separate start and end tags, with no intervening content.

FIG. 5 is a table 500 illustrating XML processing instructions and associated functions of a virtual machine configured in accordance with another embodiment of the present invention. The functions listed in table 500 illustrate functions for checking that a section, once read, matches the type of the component to which the section is to correspond per the XML schema. For example, an open tag must contain the attributes and child elements specified by the declaration type of the component of the tag. A close tag must match the matching open component tag. The functions listed in table 500 check that a component or section can legally occur in the current XML document position and that the section is the correct type.

FIG. 6 is a table 600 illustrating XML processing instructions and associated functions of a virtual machine configured in accordance with another embodiment of the present invention. The functions listed in table 600 manipulate counters that can be used in counting and/or otherwise dealing with sub-components. Since child elements can be constrained to have a minimum and/or a maximum number of occurrences within a component, the functions listed in table 600 provide mechanisms for monitoring the number of such occurrences and comparing the occurrences with the minimum and/or maximum number of occurrences specified in the XML schema.

"All group" occurrence constraints in an XML schema allow one to specify that an element needs to include several different children. If any one of the needed children is missing, validation of the XML document fails. This aspect of XML is useful, for example, for representing records such as C structs and/or Java objects, where values are accessed by named fields and are not ordered.

In one embodiment, when validating an input, a set corresponding to the all-group constraint can be maintained within the virtual machine. The set may be empty if the XML schema does not use all-group constraints. When a new child is encountered in an all-group constraint, the occurrence of the child is marked or recorded in the set corresponding to the all-group constraint. When the end of the portion defining the all-group constraint is encountered in the XML document being validated, a check can be performed to ensure that each required child of the all-group constraint was encountered, and thus marked within the set corresponding to the all-group constraint. If a given required child is not encountered, the XML document fails. Since all-group constraints can be nested, a stack of such sets can be used. When a new all-group constraint is encountered, a new set is pushed onto the stack. The set can be popped off of the stack to return to the previous constraint.

FIG. 7 is a table 700 illustrating XML processing instructions and associated functions of a virtual machine configured in accordance with another embodiment of the present invention. The functions listed in table 700 provide mechanisms for flow control. The functions of table 700 allow the appropriate function to be located for processing a next component type or section of an XML document being validated.

Figure 8:
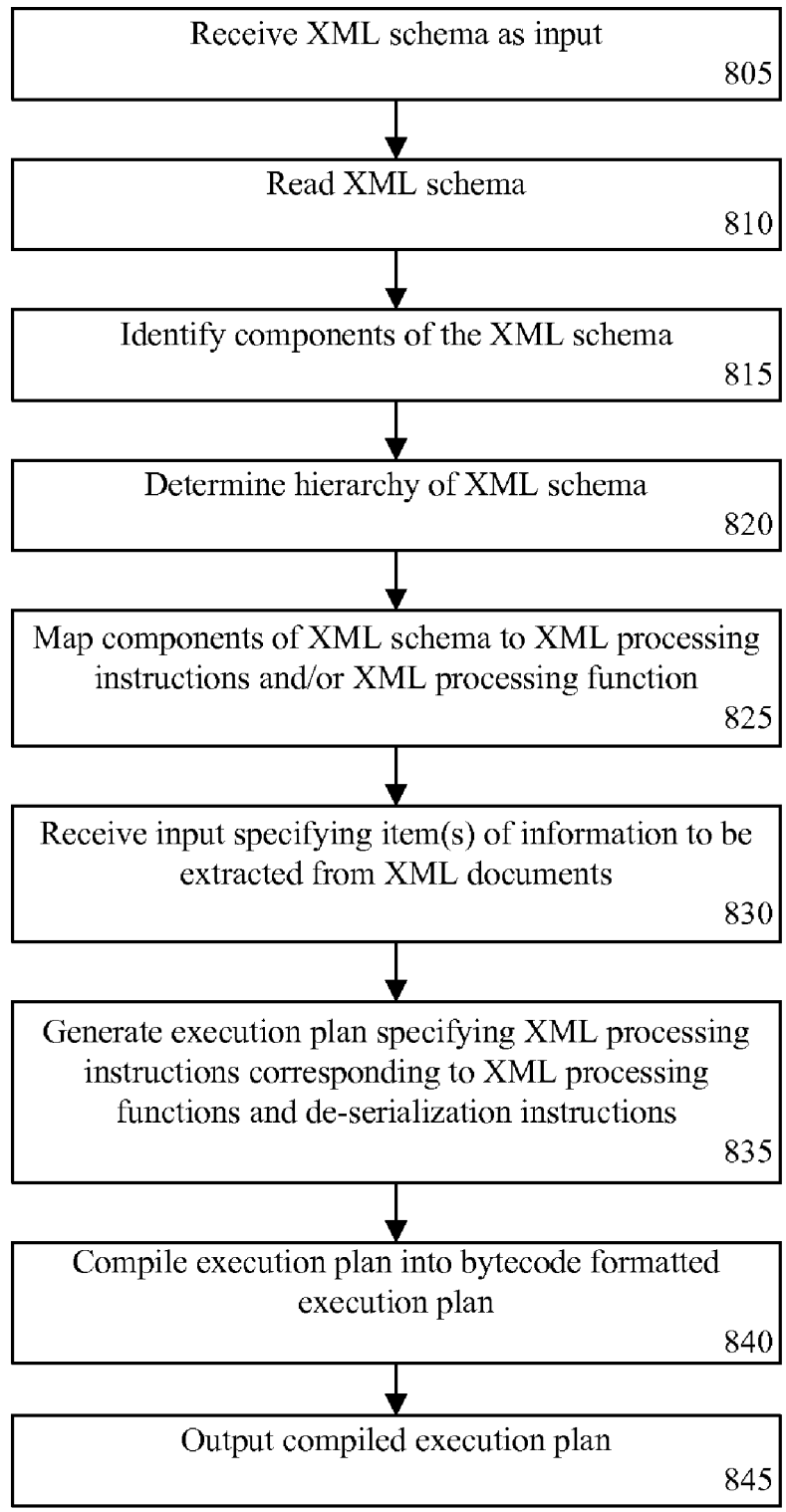
FIG. 8 is a flow chart illustrating a method of creating an execution plan in accordance with another embodiment of the present invention.

FIG. 8 is a flow chart illustrating a method 800 of creating an execution plan in accordance with another embodiment of the present invention. The method 800 can be implemented by an XML schema analyzer as described with reference to FIG. 1. Accordingly, in step 805, the XML schema analyzer can receive an XML schema as input. The XML schema analyzer can load the XML schema.

In step 810, the XML schema analyzer can read the XML schema. In step 815, the XML schema analyzer can identify the various components of the XML schema. In step 820, the XML schema analyzer can determine a hierarchy of the XML schema. The hierarchy of the XML schema reflects the structure of the XML schema, as well as the structure of the XML documents to be validated against the XML schema. For example, the nesting of components and sub-components can be determined.

In step 825, the components of the XML schema can be mapped to a plurality of bytecode instructions, e.g., XML processing instructions, and therefore functions of the virtual machine. In step 830, an input specifying one or more items of data to be de-serialized from an XML document can be received. The input further can specify de-serialization instructions in addition to items of information to be extracted. In step 835, an execution plan specifying a hierarchy of XML processing instructions can be generated. Each of the instructions can reference a particular function of the virtual machine. The hierarchy of instructions specified by the execution plan can match or correspond to the hierarchy of components of the XML schema. Within the execution plan, one or more de-serialization instructions can be inserted according to which items of information are to be extracted from XML documents. As noted, each de-serialization instruction can indicate the particular items of information to be extracted, e.g., component type(s), an output format of the extracted data, and/or a particular de-serialization module to be used.

For example, in one embodiment, a de-serialization instruction can specify a de-serialization module by name. Multiple de-serialization modules, however, may answer by that name. The de-serialization instruction further can specify which instruction in the named de-serialization module is to be called and for what purpose. The de-serialization instruction can specify that for "Name1" elements, call the SAX module for "new element found." In that case, the compiler can place a de-serialization instruction after the location in the execution plan where it is proved that a new "Name1" element is found. The inserted instruction can cause the virtual machine to call some appropriate function in the de-serialization module such as "SAX_NEW_ELEMENT" or the like based upon the name of the de-serialization instruction. The function can be passed the new element kind of information, e.g., the name of the new element. The called function in the de-serialization module can pass back a token, for example, when attributes on the element are located. In some implementations, the token can be a pointer to a data structure that is being used to de-serialize the data.

In step 840, the execution plan can be compiled into a bytecode program or version of the execution plan. In compiling the execution plan, any dependent references can be resolved. Various parameters needed by particular functions, e.g., minimum and/or maximum component occurrences, can be determined. In this manner, the instructions can be parameterized according to the components of the XML schema. The parameterized execution plan can be converted into bytecode. Parameters of the bytecode instructions can be passed to the function(s) within the virtual machine when the execution plan is executed. In step 845, the parser-generator can output the compiled execution plan. The execution plan represents the XML schema. As noted, one or more portions of the execution plan can correspond directly to one or more portions of the XML schema.

FIG. 9 is an example of an XML schema fragment 900 which is useful for understanding the embodiments disclosed herein. The XML schema fragment 900 defines a component, and more particularly, a complex type component "ExampleType." The ExampleType component has three attributes denoted as "attr1," "attr2," and "attr3," as well as a sequence of several components, e.g., sub-components. The sequence of sub-components can include either one of "Name1" or "Name2" followed by "Name3."

FIG. 9 further illustrates an embodiment in which the XML schema fragment 900 has been input into an XML schema analyzer as illustrated in FIG. 1. In this example, a user input has been received indicating that either "Name1" or "Name2," e.g., whichever is specified by the XML document, is to be extracted or de-serialized. The XML schema analyzer can insert a de-serialization instruction into the execution plan that will cause the virtual machine to query the available de-serializers to determine whether one of the de-serializers does extract the "Name 1" or "Name2" sub-components. Further, as noted, the user-input can specify a desired output format for the extracted information which can be part of the query performed by the virtual machine when attempting to locate a de-serializer.

FIG. 10 is an example of an XML document 1000 that is to be validated against the XML schema fragment pictured in FIG. 9. The XML document 1000 includes a sequence of elements including "Name2" followed by "Name3". The XML document 1000 further specifies values for each of attributes attr1, attr2, and attr3.

FIG. 11 is an example of a fragment of an execution plan 1100 that can be automatically generated by the system of FIG. 1 in accordance with another embodiment of the present invention. The execution plan fragment 1100 represents a parameterized, source code version of the implementation plan, e.g., prior to compilation or conversion to bytecode. As used herein, "source code" can refer to a code listing or source listing. As noted, execution of the execution plan fragment 1100 by a virtual machine as disclosed herein requires the virtual machine to implement the necessary functions to parse, validate, and/or de-serialize an XML document, e.g., XML document 1000, per a given XML schema, e.g., XML schema fragment 900. As each XML processing instruction can be associated with a function of the virtual machine, it should be appreciated that reference to an XML processing instruction in discussing execution plan fragment 1100 further can reference the function that is invoked within the virtual machine that corresponds to the XML processing instruction.

Since the XML schema fragment provides for three attributes, one of which is required, the "ASSERT_ATTRS" XML processing instruction is inserted with parameters permitting the attributes and requiring one. After, three "ASSERT_ATTR_CONTENT" XML processing instructions are inserted into the execution plan fragment 1100 to ensure that the type of the attribute content is as specified in the XML schema fragment. The "READ_TAG_QNAMES" XML processing instruction obtains the next block of data from the instance document, in this case the XML document being validated as pictured in FIG. 10 and checks that the next element, in this case "Name2," is a legal follower of the previous component. The "READ_TAG_QNAMES" XML processing instruction ensures the found tag is in the set of permitted tags. The "JUMP_TAG_NOT_EQUAL" XML processing instruction causes flow control to branch to the specified jump offset when the current element name does not match the required component name. The "CALL_TYPE" XML processing instruction checks the instance element for xsi-type declarations and jumps to the appropriate complex handler for the determined type (whether from the instance or the XML schema specified default type). The remaining functions referenced in the execution plan fragment 1100 perform functions similar to those already discussed.

The execution plan 1100 further includes de-serialization instructions with the operand "DESERIALIZATION." In the embodiment pictured in FIG. 11, after each piece of data, e.g., an attribute or element, a call to JAXRPC is added to new-up a corresponding Java object. The embodiment pictured in FIG. 11 will represent the entire complexType "ExampleType." The complex-type "ExampleType" is an object that has a simple named field for each attribute, and an object field for each contained complexType.

It should be appreciated that while a de-serialization instruction has been inserted between the various XML processing instructions of the execution plan, de-serialization instructions may be specified only where needed as opposed to after each instruction. Moreover, a plurality of de-serialization instructions can be inserted immediately following a particular XML processing instruction, where each de-serialization instruction performs a different function with respect to data that has just been parsed and/or validated. Each de-serialization instruction can, for example, produce a different type of output or route extracted information to a different destination.

Figure 12:
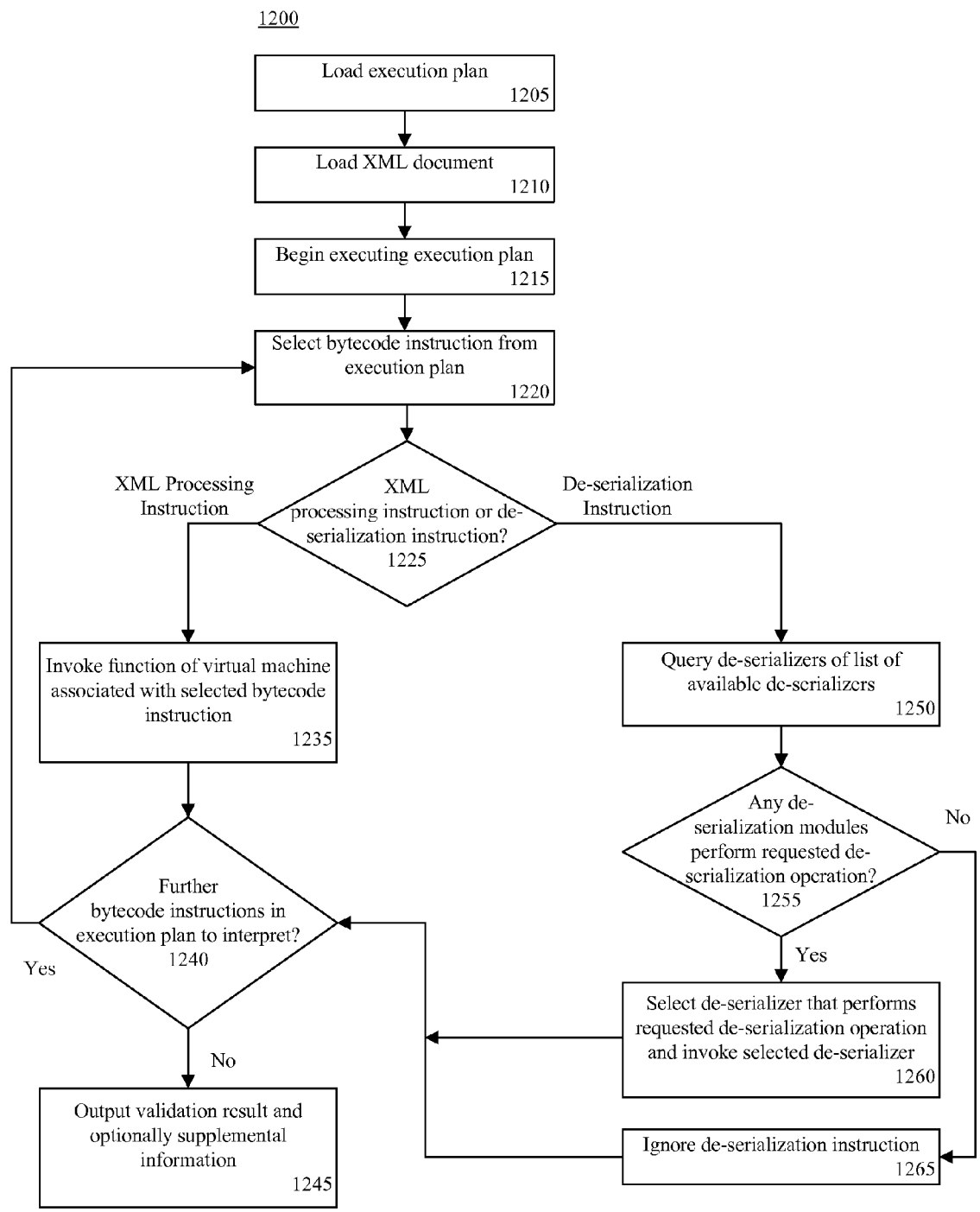
FIG. 12 is a flow chart illustrating a method of operation of a virtual machine in accordance with another embodiment of the present invention.

FIG. 12 is a flow chart illustrating a method 1200 of operation of a virtual machine in accordance with another embodiment of the present invention. The method 1200 can be implemented by a virtual machine configured as discussed herein, e.g., the virtual machine of FIG. 2. Accordingly, in step 1205, the virtual machine can load an execution plan. In step 1210, the virtual machine can load an XML document to be processed. In step 1215, the virtual machine can begin executing the execution plan.

In step 1220, the virtual machine can select a bytecode instruction from the execution plan. For example, the virtual machine can read and/or interpret the bytecode instructions of the execution plan and select a first, or next as the case may be, bytecode instruction. In step 1225, the virtual machine can determine whether the selected bytecode instruction corresponds to an XML processing instruction or to a de-serialization instruction.

In one embodiment, if the bytecode instruction is not recognized by the virtual machine, the virtual machine can assume the bytecode instruction to be a de-serialization instruction. In another embodiment, the virtual machine can be configured to recognize the opcode or other mnemonic of the bytecode instruction as a de-serialization instruction. If the virtual machine determines the selected bytecode instruction corresponds to an XML processing instruction, the method can continue to step 1235. Otherwise, the method can proceed to step 1250.

In step 1235, a function of the virtual machine that is associated with the selected bytecode instruction can be invoked. Any parameters needed by the function can be obtained or passed in from the selected bytecode instruction. In step 1240, the virtual machine can determine whether any further bytecode instructions remain in the execution plan for interpretation. If so, the method can loop back to step 1220 to continue execution of the execution plan. If not, the method can proceed to step 1245. The virtual machine can read the bytecode instructions of the execution plan and invoke the function(s) corresponding to each respective bytecode instruction as executed or interpreted.

Continuing with step 1250, where the selected bytecode instruction was determined to be a de-serialization instruction, the virtual machine can query the de-serialization modules registered with the virtual machine. For example, the virtual machine can query each de-serialization module one-by-one. The virtual machine can continue until a de-serialization module is identified that performs the needed de-serialization operation, as specified by the de-serialization bytecode instruction, or until all of the de-registered serialization modules have been queried and the virtual machine determines that no registered de-serialization module performs the requested de-serialization operation.

The manner in which de-serialization modules are queried can be implementation dependent. For example, if de-serialization instructions can be specific to de-serialization modules, when a de-serialization module is found for a given de-serialization bytecode instruction, the querying can terminate. If, for example, several de-serialization modules require the same input data, every de-serialization module may be queried by the virtual machine, even when a particular de-serialization module responds in the affirmative. In another embodiment, where a portion of the input data can be used by only one de-serialization module, when a de-serialization module responds in the affirmative to the query issued by the virtual machine, as an optimization, no further de-serialization modules need be queried. Further, the choice whether to stop querying at a first matching-handler or query each handler can be a switch or preference within the virtual machine.

In step 1255, a determination can be made by the virtual machine as to whether any registered de-serialization modules perform the de-serialization operation specified by the de-serialization bytecode instruction. If a de-serialization module responds indicating that it can perform the requested de-serialization operation, the method can proceed to step 1260. If no registered de-serialization modules perform the requested de-serialization operation, the method can proceed to step 1265.

In one embodiment, answers corresponding to queries can be cached for future use. Caching answers may allow the virtual machine to avoid the query process in a subsequent loop or decision process. It should be appreciated that the de-serialization instructions correspond to a given namespace within the execution plan. Accordingly, the de-serialization modules further support a given namespace, which can reduce the amount of querying required.

In step 1260, the virtual machine can select the de-serialization module that responds in the affirmative, e.g., can select the de-serialization module that can perform the requested de-serialization operation. Accordingly, the virtual machine can invoke the selected de-serialization module. The de-serialization module can be configured to extract the information specified by the de-serialization bytecode instruction and provide that information to a designated recipient system or program as well as in a specified format. The virtual machine further can pass any parameters specified as part of the de-serialization bytecode instruction to the selected de-serialization module that may be required. After step 1260, the method can proceed to step 1240.

In step 1265, where no de-serialization module is identified, the virtual machine can ignore the de-serialization bytecode instruction. In this manner, the lack of a de-serialization module will not affect the operation of the virtual machine in terms of parsing and/or validation of the XML document. It should be appreciated, however, that if so desired, a failure condition or other warning indication can be provided. In step

1245, the virtual machine executing the execution plan can output a validation result for the XML document. The validation result can be determined via operation of the functions, as selected by the execution plan, upon the XML document.

In one embodiment, the validation result can specify whether the received XML document was valid or not. In another embodiment, the validation result can specify supplemental information including, but not limited to, a Post Schema Validation Infoset (PSVI) in any of a variety of formats. A PSVI, for example, can specify information about how validation occurred or other supplemental information indicating various internal parameters of the virtual machine during parsing and/or validation.

It should be appreciated that the de-serialization module may include code that checks the final status of the XML document, e.g., being valid or not, prior to sending any de-serialized data to a recipient system or subsystem. In another embodiment, the de-serialization module can send the de-serialized information and the recipient can include code that checks the status of the XML document. In that case, the recipient can include functionality to reverse any processing of the de-serialized information in the event that the XML document is not valid. For example, the recipient can buffer the received de-serialized information until such time that an indication of the validity of the XML document is received from the virtual machine.

In another embodiment, the de-serialization instruction can be modified such that the user can specify the particular de-serialization module that is to be used. In that case, the specified de-serialization module can be invoked. If the specified de-serialization module is not available, the virtual machine can ignore the de-serialization instruction. In another embodiment, the virtual machine can query for a de-serialization module that can perform the de-serialization operation that was to be performed by the user-specified de-serialization module. If an alternate de-serialization module is identified, the alternate de-serialization module can be selected and invoked.

In another embodiment, the particular execution plan that is loaded by the virtual machine can be selected from a plurality of different execution plans, where each execution plan is derived from a different XML schema. In this regard, the virtual machine effectively can implement any of a variety of different XML schema specific parsers according to the particular execution plan that is loaded into the virtual machine. Thus, a first execution plan can be loaded to validate a first XML document against a first XML schema. A second execution plan then can be loaded to validate a second XML document against a second XML schema, etc. The process of loading and/or unloading different execution plans further can be programmatically automated, follow a predetermined pattern, and/or be dynamically determined, for example, by another system communicatively linked with the virtual machine.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. Within a system comprising a processor and a memory, a method of creating a schema specific parser for processing Extensible Markup Language (XML) documents, the method comprising:
    receiving an XML schema comprising a plurality of components;
    determining, via the processor, a hierarchy of the plurality of components of the XML schema and storing the hierarchy in a memory;
    creating, via the processor, an execution plan specifying a hierarchy of XML processing instructions, wherein each of said XML processing instructions is associated with an XML processing function of a virtual machine,
        wherein each XML processing function instructs the virtual machine to automatically perform a processing task upon an XML document, and said hierarchy of XML processing instructions is determined according to the hierarchy of components of the XML schema;
    inserting into the execution plan, via the processor, at least one instruction that causes the virtual machine to invoke a de-serialization module that extracts at least one item of information from the XML document;
    compiling, via the processor, the execution plan into a bytecode version of the execution plan that is interpretable by the virtual machine; and outputting the bytecode version of the execution plan to the memory.

2. The method of claim 1, wherein the de-serialization module is incorporated into the virtual machine through an XML extension and performs at least one additional schema related processing function.

3. The method of claim 1, wherein inserting into the execution plan further comprises defining the instruction to specify the item of information to be extracted according to the XML schema.

4. Within a system comprising a processor and a memory, a method of processing an Extensible Markup Language (XML) document, the method comprising:
loading, via the processor, an execution plan into a virtual machine and storing the execution plan in a memory, wherein the virtual machine consists of XML processing functions and the execution plan represents an XML schema;
selectively invoking, via the processor, XML processing functions available within the virtual machine according to the execution plan, wherein the XML processing functions operate upon an XML document conforming to the XML schema represented by the execution plan;
selectively invoking, via the processor, a de-serialization module according to the execution plan, wherein the de-serialization module is configured as a plug-in of the virtual machine and de-serializes at least one item of information from the XML document; and
outputting the de-serialized item of information to the memory.

5. The computer-implemented method of claim 4, wherein selectively invoking XML processing functions comprises:
identifying a bytecode instruction within the execution plan;
selecting an XML processing function that is associated with the bytecode instruction from a plurality of XML processing functions of the virtual machine; and
executing the selected XML processing function.

6. The computer-implemented method of claim 4, wherein selectively invoking a de-serialization module further comprises:
identifying a de-serialization bytecode instruction within the execution plan; and
selecting a de-serialization module that de-serializes the item of information according to the de-serialization bytecode instruction from a plurality of de-serialization modules.

7. The computer-implemented method of claim 6, wherein selecting a de-serialization module further comprises querying at least one of the plurality of de-serialization modules whether the de-serialization module performs a de-serialization operation specified by the de-serialization bytecode instruction.

8. The computer-implemented method of claim 4, wherein selectively invoking a de-serialization module further comprises:
identifying a de-serialization bytecode instruction within the execution plan;
determining that no de-serialization module of a plurality of de-serialization
modules performs a de-serialization operation specified by the de-serialization bytecode instruction; and
ignoring the de-serialization bytecode instruction.

9. The computer-implemented method of claim 4, wherein the de-serialization module is incorporated into the virtual machine through an XML extension and performs at least one additional schema related processing function.

10. The computer-implemented method of claim 4, wherein selectively invoking XML processing functions further comprises selecting an XML processing function that reads a section of the XML document according to an expected component type of the section.

11. The computer-implemented method of claim 4, wherein selectively invoking XML processing functions further comprises selecting an XML processing function that checks a section of the XML document against a component type associated with the section.

12. The computer-implemented method of claim 4, wherein selectively invoking XML processing functions further comprises selecting at least one of an XML processing function that counts a number of occurrences of a component in the XML document or an XML processing function that performs flow control within the virtual machine.

13. The computer-implemented method of claim 4, wherein the de-serialization module selects a portion of the XML document for de-serialization according to a de-serialization bytecode identified within the execution plan.

14. A computer program product comprising:
a computer-usable storage medium having stored thereon computer-usable program code that, when executed by a system comprising a processor and a memory, causes the system to perform a method of processing an Extensible Markup Language (XML) document, the method comprising:
loading an execution plan into a virtual machine, wherein the virtual machine consists of XML processing functions and the execution plan represents an XML schema;
selectively invoking XML processing functions available within the virtual machine according to the execution plan, wherein the XML processing functions operate upon an XML document conforming to the XML schema represented by the execution plan;
selectively invoking a de-serialization module according to the execution plan, wherein the de-serialization module is configured as a plug-in of the virtual machine and de-serializes at least one item of information from the XML document; and
outputting the de-serialized item of information.

15. The computer program product of claim 14, wherein selectively invoking XML processing functions comprises:
identifying a bytecode instruction within the execution plan;
selecting an XML processing function that is associated with the bytecode instruction from a plurality of XML processing functions of the virtual machine; and
executing the selected XML processing function.

16. The computer program product of claim 14, wherein selectively invoking a de-serialization module further comprises:
identifying a de-serialization bytecode instruction within the execution plan; and
selecting a de-serialization module that de-serializes the item of information according to the de-serialization bytecode instruction from a plurality of de-serialization modules.

17. The computer program product of claim 16, selecting a de-serialization module further comprises querying at least one of the plurality of de-serialization modules whether the de-serialization module performs a de-serialization operation specified by the de-serialization bytecode instruction.

18. The computer program product of claim 14, wherein selectively invoking a de-serialization module further comprises:

identifying a de-serialization bytecode instruction within the execution plan;

determining that no de-serialization module of a plurality of de-serialization modules performs a de-serialization operation specified by the de-serialization bytecode instruction; and ignoring the de-serialization bytecode instruction.

19. The computer program product of claim 14, wherein the de-serialization module is incorporated into the virtual machine through an XML extension and performs at least one additional schema related processing function.

20. The computer program product of claim 14, wherein selectively invoking a de-serialization module further comprises:

selecting a portion of the XML document for de-serialization according to a de-serialization bytecode identified within the execution plan.

* * * * *